US011820484B2

(12) United States Patent
Louvel et al.

(10) Patent No.: US 11,820,484 B2
(45) Date of Patent: Nov. 21, 2023

(54) AIRCRAFT DOOR HAVING A MECHANISM FOR CONDITIONAL OPENING ALONG TWO TRAJECTORIES

(71) Applicant: LATECOERE, Occitaine (FR)

(72) Inventors: Fabian Louvel, Occitanie (FR); Denis Chabot, Occitanie (FR)

(73) Assignee: LATECOERE, Toulouse (FR)

( * ) Notice: Subject to any disclaimer, the term of this patent is extended or adjusted under 35 U.S.C. 154(b) by 182 days.

(21) Appl. No.: 17/437,570

(22) PCT Filed: Mar. 9, 2020

(86) PCT No.: PCT/EP2020/056262
§ 371 (c)(1),
(2) Date: Sep. 9, 2021

(87) PCT Pub. No.: WO2020/182766
PCT Pub. Date: Sep. 17, 2020

(65) Prior Publication Data
US 2022/0126974 A1    Apr. 28, 2022

(30) Foreign Application Priority Data
Mar. 12, 2019  (FR) ..................................... 1902540

(51) Int. Cl.
*B64C 1/14* (2006.01)
(52) U.S. Cl.
CPC ............ *B64C 1/143* (2013.01); *B64C 1/1461* (2013.01)

(58) Field of Classification Search
CPC .............................. B64C 1/143; B64C 1/1461
See application file for complete search history.

(56) References Cited

U.S. PATENT DOCUMENTS

| | | | | |
|---|---|---|---|---|
| 8,201,777 B2 * | 6/2012 | Wilson | ................... | B64C 1/1415 292/336.3 |
| 2010/0294887 A1 * | 11/2010 | Depeige | ................ | B64C 1/1407 244/129.5 |
| 2011/0049299 A1 | 3/2011 | Gowing | | |

FOREIGN PATENT DOCUMENTS

| | | |
|---|---|---|
| EP | 0677438 | 10/1995 |
| EP | 3168138 | 5/2017 |
| FR | 2794717 | 12/2000 |
| WO | WO2017076848 | 5/2017 |

\* cited by examiner

*Primary Examiner* — Joshua J Michener
*Assistant Examiner* — Ka Chun Leung
(74) *Attorney, Agent, or Firm* — Defillo & Associates, Inc.; Evelyn A. Defillo

(57) ABSTRACT

Aircraft door (1) having an inside door opening lever (6) coupled to a vent flap (5) by a conditional opening mechanism having two modes and including a flap stop (20) to cooperate with a stop surface (21). The stop (20) has a first trajectory, the stop surface (21) being arranged outside this first trajectory of the flap stop (20). The stop (20) has a second trajectory, the stop surface (21) being arranged on this second trajectory of the flap stop (20).

16 Claims, 7 Drawing Sheets

AIRCRAFT DOOR HAVING A MECHANISM FOR CONDITIONAL OPENING ALONG TWO TRAJECTORIES

CROSS REFERENCE TO RELATED APPLICATION

This application is a national stage entry of PCT/EP2020/056262 filed Mar. 9, 2020, under the International Convention and claiming priority over French Patent Application No. 1902540 filed Mar. 12, 2019.

TECHNICAL FIELD

The invention relates to the field of aeronautics and proposes an aircraft door equipped with a mechanism for safe conditional opening.

PRIOR ART

Patent application WO2017076848 describes an aircraft door comprising:
 a door structure and an outer panel fastened to this door structure;
 means for locking the door to the fuselage of the aircraft;
 an inside door opening lever capable of operating the locking means, this inside lever being coupled to a vent flap by a conditional opening mechanism having two modes, namely a mode allowing the release of the door when the differential pressure applied to the vent flap is below a predetermined threshold and a mode preventing the release of the door when the differential pressure applied to the vent flap is above the predetermined threshold.

In this prior art aircraft door, the conditional opening mechanism performs a safety function, among others. This mechanism allows the opening of the door when the differential pressure is below a predetermined threshold. The differential pressure is defined here as the pressure applied to the door when the difference between the pressure inside the aircraft and the pressure outside the aircraft is taken into account. When the differential pressure is below this predetermined threshold, the situation is one in which the aircraft cabin is not pressurized (as is the case, notably, when the aircraft is on the ground) and the door may then be opened without any danger.

Conversely, in the case where the aircraft cabin is pressurized, in flight for example, the pressure outside the aircraft is much lower than the pressure inside the cabin, the latter pressure being kept at a pressure close to atmospheric pressure by the pressurization equipment of the aircraft. The differential pressure is then significant, and the opening of the door in these conditions may represent a danger. In these conditions, the opening of the door is prevented by the conditional opening mechanism, which does not allow the inside lever to operate the locking means.

Thus, even if an operator manipulates the inside lever accidentally or intentionally, the door cannot be opened. The release of the locking means by the inside lever, and therefore the opening of the door, is possible only when the differential pressure is at an acceptable level, that is to say when it is below the predetermined threshold.

SUMMARY OF THE INVENTION

The aim of the invention is to improve the prior art aircraft doors as regards the arrangement of the safe conditional opening mechanism.

To this end, the invention proposes an aircraft door comprising:
 a door structure and an outer panel fastened to this door structure;
 means for locking the door to the fuselage of the aircraft;
 an inside door opening lever capable of operating the locking means, this inside lever being coupled to a vent flap by a conditional opening mechanism having two modes, namely a mode allowing the release of the door when the differential pressure applied to the vent flap is below a predetermined threshold and a mode preventing the release of the door when the differential pressure applied to the vent flap is above the predetermined threshold;
 this aircraft door also having the following characteristics:
 the conditional opening mechanism comprises: a spring urging the vent flap and the inside lever against each other; a flap stop positioned on the vent flap; a stop surface positioned facing the flap stop;
 the inside lever is mounted pivotably on the door structure, about a first pivot axis defining a first trajectory of the flap stop in which the vent flap and the inside lever are held against each other by the spring and pivot together about the first pivot axis, the stop surface being positioned outside this first trajectory of the flap stop;
 the vent flap is mounted pivotably on the inside lever, about a second pivot axis defining a second trajectory of the flap stop in which the inside lever pivots about the first pivot axis while the vent flap and the inside lever pivot relative to each other about the second pivot axis, the stop surface being positioned on this second trajectory of the flap stop;

The vent flap is subjected to the pressure outside the aircraft and the internal pressure of the aircraft (the cabin pressure), on its outside and inside face respectively.

When the differential pressure is low, or more precisely below a predetermined threshold, the vent flap can therefore be moved simply by the force of the operator actuating the inside lever. When the differential pressure is above the predetermined level, this pressure applied to the inside face of the vent flap is sufficiently high to cause the special safe operation of the vent flap actuation mechanism, acting in such a way that the operator actuating the inside opening lever does not have the force to cause the movement of the vent flap.

In the present description and the claims, the adjective "inside" relates to the interior of the aircraft, that is to say the cabin, which is delimited by the fuselage of the aircraft and may be pressurized in flight. As for the adjective "outside", this relates to the outside of the aircraft, that is to say to the ambient environment in which the aircraft is placed. An element located inside the aircraft cabin is thus described as "inside", while an element located outside the aircraft is described as "outside".

The invention proposes an aircraft door equipped with a mechanism for safe conditional opening which is extremely simple and therefore extremely robust, these qualities being particularly sought-after in the field of aeronautics.

The conditional opening mechanism used by the invention has few moving parts and contains none of the parts commonly used in the prior art, such as cams, cam tracks, rollers, return bars or articulated mechanisms. Moving parts that do not directly participate in the control of the locking means or the articulation of the flap may be completely dispensed with in this case. In addition to the gain in robustness, this yields a weight saving associated with a saving of the costs which are also a common matter of concern in the field of aeronautics.

The invention is also adaptable to many arrangements of the inside opening lever and the locking means. The first pivot axis and the second pivot axis may be arranged to correspond to a particular type of door arrangement, and similarly the flap stop and the stop surface may be positioned so as to be adapted to a particular configuration.

The aircraft door according to the invention may comprise the following additional characteristics, alone or in combination:

- the stop surface is positioned on the door structure;
- the stop surface is defined by a boss of the door structure;
- the flap stop comprises a tooth projecting from the vent flap;
- the flap stop comprises two stops positioned on the lateral edges of the vent flap, the stop surface being formed by a stop surface facing each of these stops;
- the spring comprises two tension springs, the ends of which are connected to the vent flap and to the inside lever respectively;
- the second pivot axis is defined by at least one pivot by means of which the vent flap is mounted rotatably on the outside lever;
- the spring has a stiffness suitable for:
- keeping the inside lever and the vent flap fixed to each other when the differential pressure applied to the vent flap is below the predetermined threshold;
- allowing the inside lever to pivot relative to the vent flap when the differential pressure applied to the vent flap is above the predetermined threshold;
- the first pivot axis and the second pivot axis are parallel and do not coincide;
- the vent flap comprises a sealing gasket on its periphery;
- the sealing gasket has a thickness suitable for maintaining the seal between the vent flap and the outer panel when the flap stop is in its second trajectory and is positioned against the stop surface;
- the sealing gasket has a thickness suitable for creating a calibrated leakage between the vent flap and the outer panel when the flap stop is in its second trajectory and is positioned against the stop surface;
- the first trajectory is a trajectory in the form of a circular arc centered on the first pivot axis;
- the first pivot axis is defined by a shaft mounted by bearings on the door structure, the inside lever being fastened to this shaft;
- said shaft is fixed to an operating mechanism for the door locking means;
- the inside lever comprises a lever lug, and the vent flap comprises a stop, the lever lug being positioned against said stop when the vent flap and the inside lever are positioned against each other.

DESCRIPTION OF THE FIGURES

Other characteristics and advantages of the invention will be apparent from the description given below, for illustrative purposes and in an entirely non-limiting way, with reference to the attached drawings, of which.

DETAILED DESCRIPTION

Figure 1:
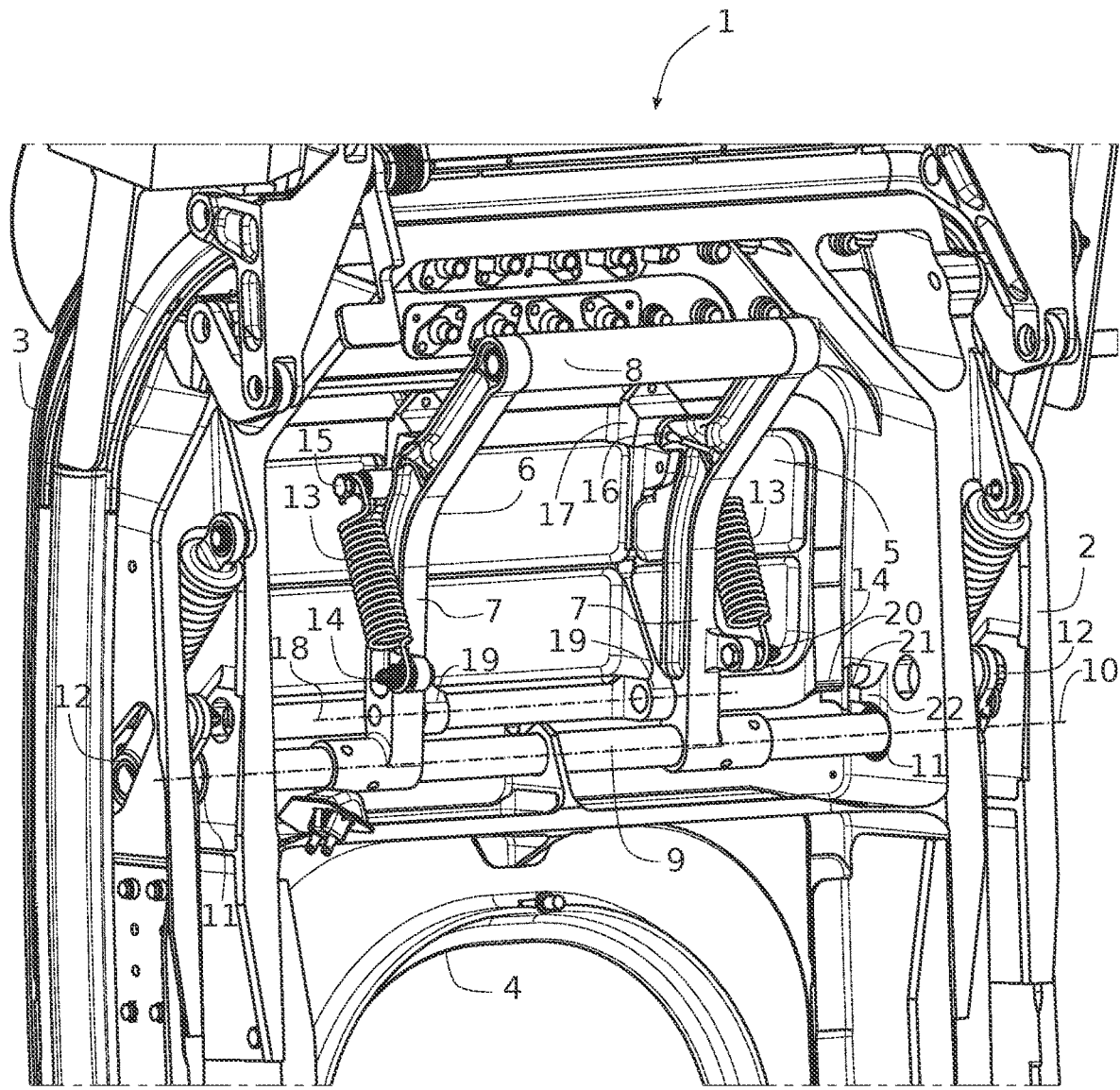
FIG. 1 is a perspective view of an aircraft door according to the invention, seen from the inside.

FIG. 1 is a partial representation of a aircraft door 1 according to the invention. This door 1 comprises a door structure 2 constructed from beams and side members to provide the mechanical strength of the door 1 and the support for the various pieces of equipment with which such a door 1 is usually fitted. The door 1 also comprises an outer panel 3 fastened to the door structure 2. The door 1 may be a door for the embarkation and disembarkation of passengers, an emergency exit door, or any other openable body section of the aircraft.

The outer panel 3, commonly called the "skin", is placed in the alignment of the aircraft fuselage when the door 1 is closed. The door 1 can be moved between an open position and this closed position with the aid of known means of articulation such as hinges, deformable parallelograms, etc. (not shown). In the case of some emergency exit doors, the door 1 may have no hinge.

When the door 1 is in the closed position, the door structure 2 is placed facing the aircraft structure, and locking means are provided between these two structures. These means for locking the door in its closed position are known and will not be detailed further here. They include, for example, stops located on the door structure 2 and counter-stops located on the aircraft structure. The locking means lock the stops and counter-stops against each other so that the door is kept in place and locked in the frame provided for it in the fuselage.

The door structure 2 may have openings for receiving various windows or panels. In the present example, the door 1 comprises a window 4 and a vent flap 5.

The partial view of FIG. 1 shows, in this example, the upper part of the door 1 in which an opening lever 6 is located. Here, the opening lever 6 comprises two arms 7 connected by a handle 8. The opening lever 6 is fastened to a shaft 9. The shaft 9 is mounted pivotably on the door structure 2, about a first pivot axis 10, by means of bearings 11.

The shaft 9 is fixed to an operating mechanism 12 so that the opening lever 6 can actuate the operating mechanism 12 to lock or release the door 1. In the present example, the opening lever 6 is shown in the locking position in FIG. 1. The door 1 can be released by pulling the handle 8 downward.

When the door 1 has been released, that is to say when the locking means have been inactivated by the operating mechanism 12 as a result of the actuation of the opening lever 6, the door 1 can then be moved toward its open position.

The operating mechanism 12 (as well as the locking means for the door 1) are also known and will not be detailed further here. This operating mechanism 12 may, for example, comprise levers actuated by the rotation of the shaft 9 and moving, by means of connected rods, locking stops of the door 1, thus releasing the door 1 from the aircraft fuselage.

The opening of the door 1 when the aircraft cabin is pressurized, notably in flight, is prevented here by a safe conditional opening mechanism.

The conditional opening mechanism comprises a spring element urging the vent flap 5 and the inside lever 6 against each other. This spring element is here formed by a pair of tension springs 13, each stretched between a finger 14 fixed to the inside lever 6 and a finger 15 fixed to the vent flap 5.

The inside lever 6 further comprises a pair of lugs 16 positioned against a pair of stops 17 of the vent flap 5 when the inside lever 6 and the vent flap 5 are positioned against each other (which is the case in FIG. 1). The inside lever 6, when moved upward (with reference to the figures), can thus push and reclose the vent flap 5.

The vent flap 5 is mounted pivotably on the inside lever 6 about a second pivot axis 18. The second pivot axis 18 is formed, in the present example, by two pivots 19 of the vent flap 5, each connected to an arm 7 of the inside lever 6. The first pivot axis 10 and the second pivot axis 18 are parallel and do not coincide. The distance between these two axes 10, 18 is of the order of 1 cm to several centimeters.

The conditional opening mechanism further comprises a flap stop 20, which is here formed by two projecting teeth located on the lateral edges of the vent flap 5 (in FIG. 1, only the right-hand stop 20 is visible, while the left-hand stop is concealed by the door structure 2).

These flap stops 20 are capable of interacting with a stop surface 21. In the present example, a boss 22 is fastened to the door structure 2, this boss 22 having the stop surface 21 on one of its faces. For each of the flap stops 20, the conditional opening mechanism thus comprises a boss 22 located facing the corresponding stop 20. This positioning of each stop surface 21 facing a flap stop 20 is such that a plane orthogonal to the first pivot axis 10 passes through both the stop surface 21 and the flap stop 20. The fact that a flap stop 20 and a stop surface 21 are located in the same plane enables the stop surface 21 to impede the movement of the stop 20 for certain trajectories of the stop 20.

FIG. 1 shows the door 1 in the closed and locked position. Starting from this position of FIG. 1, there are two possible configurations, namely a configuration in which the conditional opening means allow the release of the door 1 (shown in FIG. 2), and a configuration in which the conditional opening means prevent the release of the door 1 (shown in FIG. 3).

Figure 2:
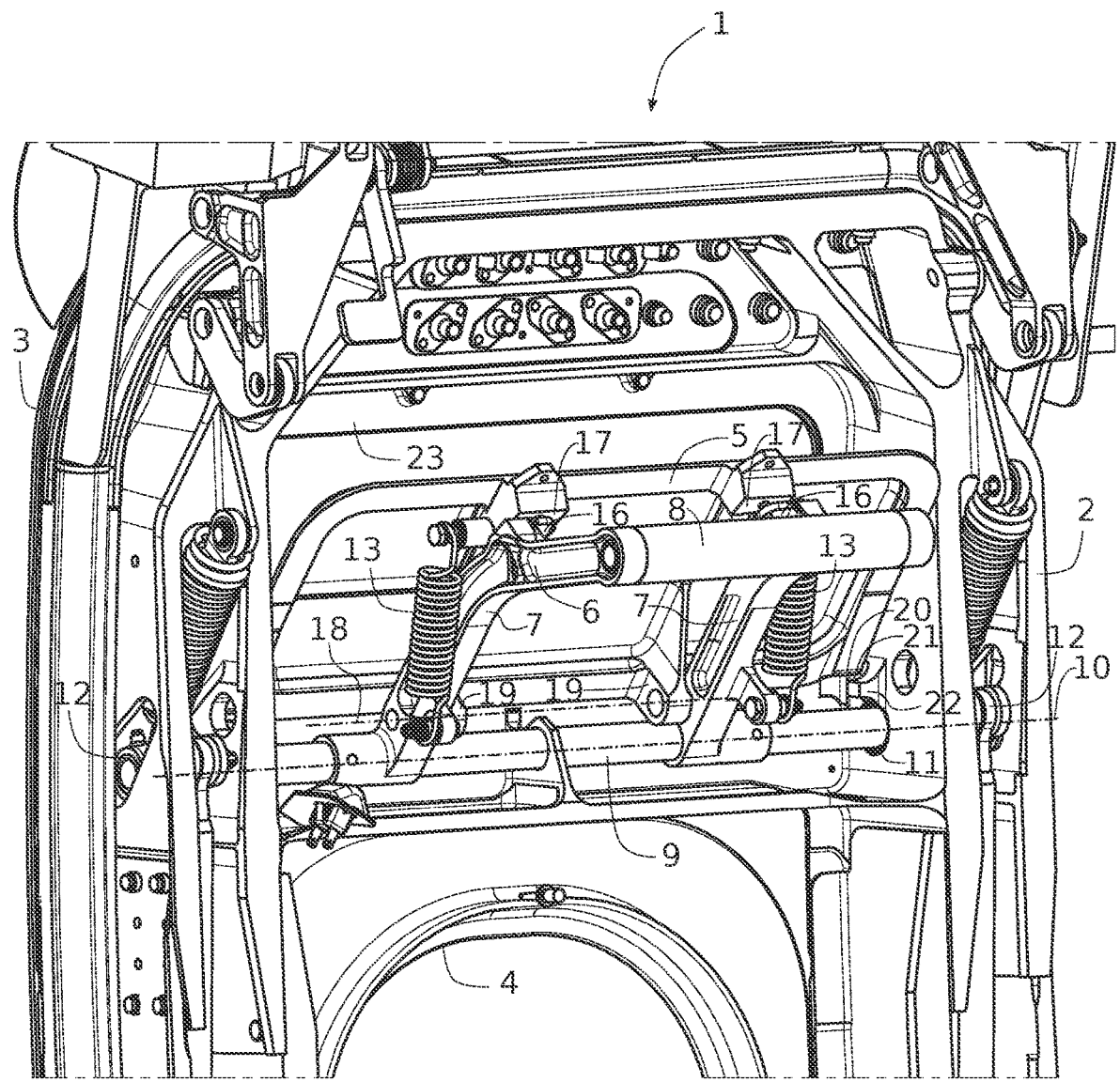
FIG. 2 shows the door of FIG. 1 in a configuration where opening is allowed.

In FIG. 2, the vent flap 5 is shown in the open position. In this position, the vent flap 5 frees a window 23 (conversely, in the configuration of FIG. 1, the vent flap 5 hermetically seals the window 23). In order to reach the configuration of FIG. 2, the handle 8 has been actuated downward so that the inside lever 6 has pivoted about the first pivot axis 10. During the pivoting of the inside lever 6, there has been no relative movement between the vent flap 5 and the inside lever 6, because the vent flap 5 has continued to be held against the inside lever 6 by the springs 13. This configuration of FIG. 2 is obtained when the differential pressure is below a predetermined level corresponding to an acceptable level for opening the door 1. The acceptable differential pressure thresholds are known to those skilled in the art, and may also be specified in regulations.

The springs 13 are calibrated so that, when the differential pressure is below the predetermined level, the springs 13 permanently hold the vent flap 5 against the inside lever 6 during the pivoting of the lever. The calibration of the springs 13 consists in choosing their stiffness so that they are capable of shifting the vent flap 5 with the movement of the inside lever 6 when the differential pressure is below the predetermined level, and, conversely, so that they cannot overcome the differential pressure when it is greater than the predetermined level, the springs 13 then being stretched to allow the inside lever 6 to move relative to the vent flap 5.

In the configuration of FIG. 2, the flap stops 20 follow a first trajectory defined by the first pivot axis 10. The stop surfaces 21 are positioned outside this first trajectory and therefore do not interfere with the movement of the vent flap 5. In other words, in the configuration of FIG. 2, the stop surfaces do not limit the movement of the flap stops 20.

Figure 3:
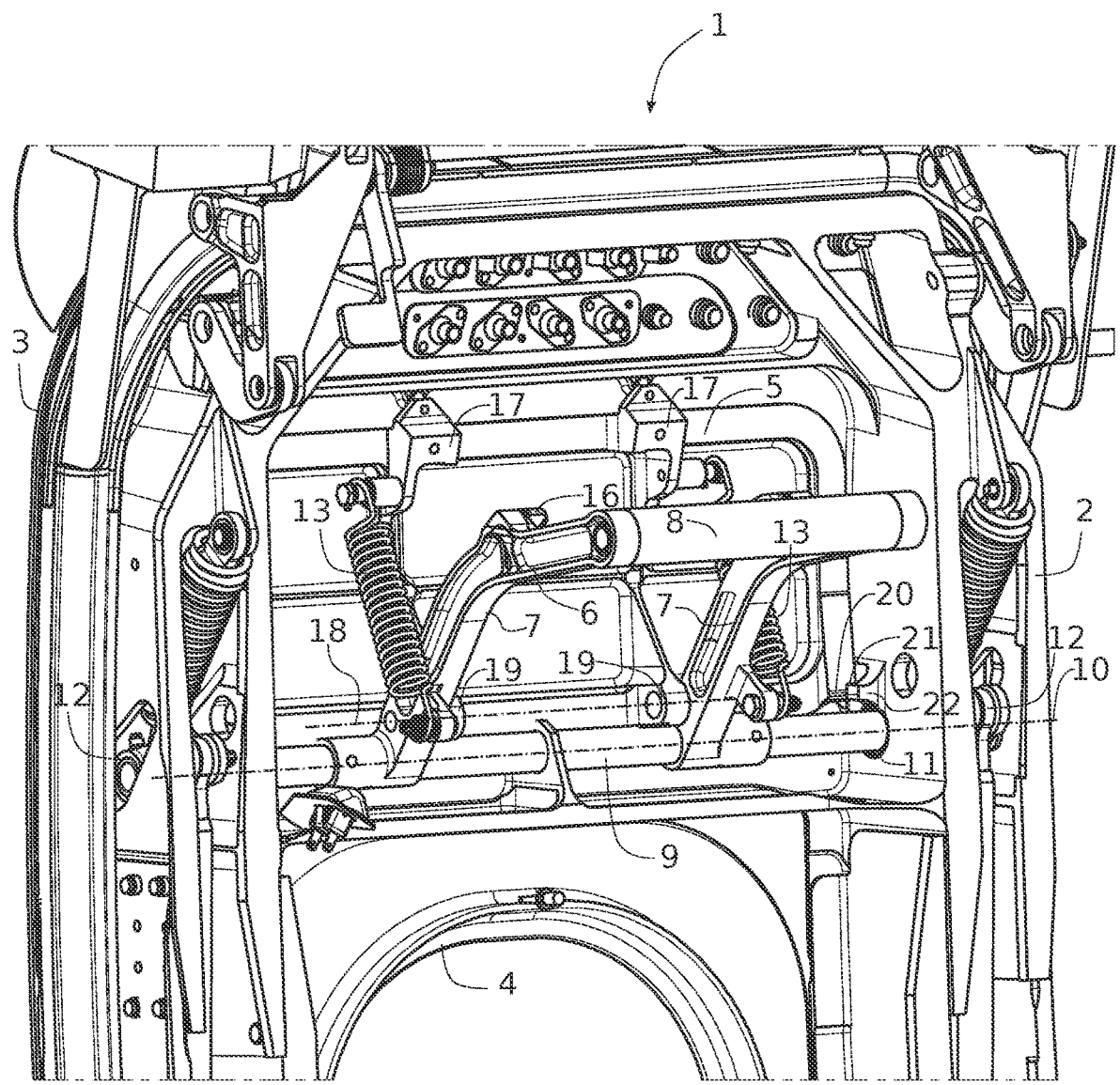
FIG. 3 shows the door of FIG. 1 in a configuration where opening is not allowed.

FIG. 3 shows a configuration in which the handle 8 has been actuated downward for releasing the door 1 while the differential pressure is greater than the predetermined level, that is to say when the differential pressure makes it dangerous to open the door. In this configuration, the inside lever 6 has pivoted about the first pivot axis 10 and, during this pivoting, the vent flap 5 has remained in place, in its upper part at least, against the outer panel 3. This is because, owing to the calibration of the springs 13 described previously, the pressure exerted on the inside surface of the vent flap 5 holds the flap in place against its window 23, while the springs 13 stretch as the inside lever 6 pivots, the springs 13 not exerting sufficient force to move the vent flap 5. However, the lower part of the vent flap 5 describes a small inward movement, since the pivots 19 are moved about the first pivot axis 10. The flap stops 20 therefore describe a second trajectory. The stop surfaces 21 are positioned on this second trajectory of the flap stops 20. This second trajectory is defined by the second pivot axis 18 jointly with the first pivot axis 10. When the flap stops 20 follow the second trajectory, the vent flap 5 and the inside lever 6 pivot relative to each other about the second axis 18.

Therefore, in the configuration of FIG. 3, the pivoting of the inside lever 6 moves the flap stops 20 along the second trajectory until each of the flap stops comes to bear against the corresponding stop surface 21. This bearing of each flap stop 20 against its stop surface 21 sets a limit to the pivoting of the inside lever 6, which is therefore unable to pivot beyond this limit.

Additionally, the locking means of the door 1 are arranged so that the travel of the inside lever 6 up to the limit set by this bearing is not sufficient to cause the release of the locking means. In other words, in order to release the door 1, the inside lever 6 must be pivoted downward beyond the limit set by the bearing of the flap stops 20 on the stop surfaces 21. In the configuration of FIG. 3, the release of the door is thus prevented, because the conditional opening mechanism limits (by the bearing of the elements 20, 21) the pivoting of the inside lever 6 to a travel which is insufficient for proceeding to the release of the locking means.

Figure 5:
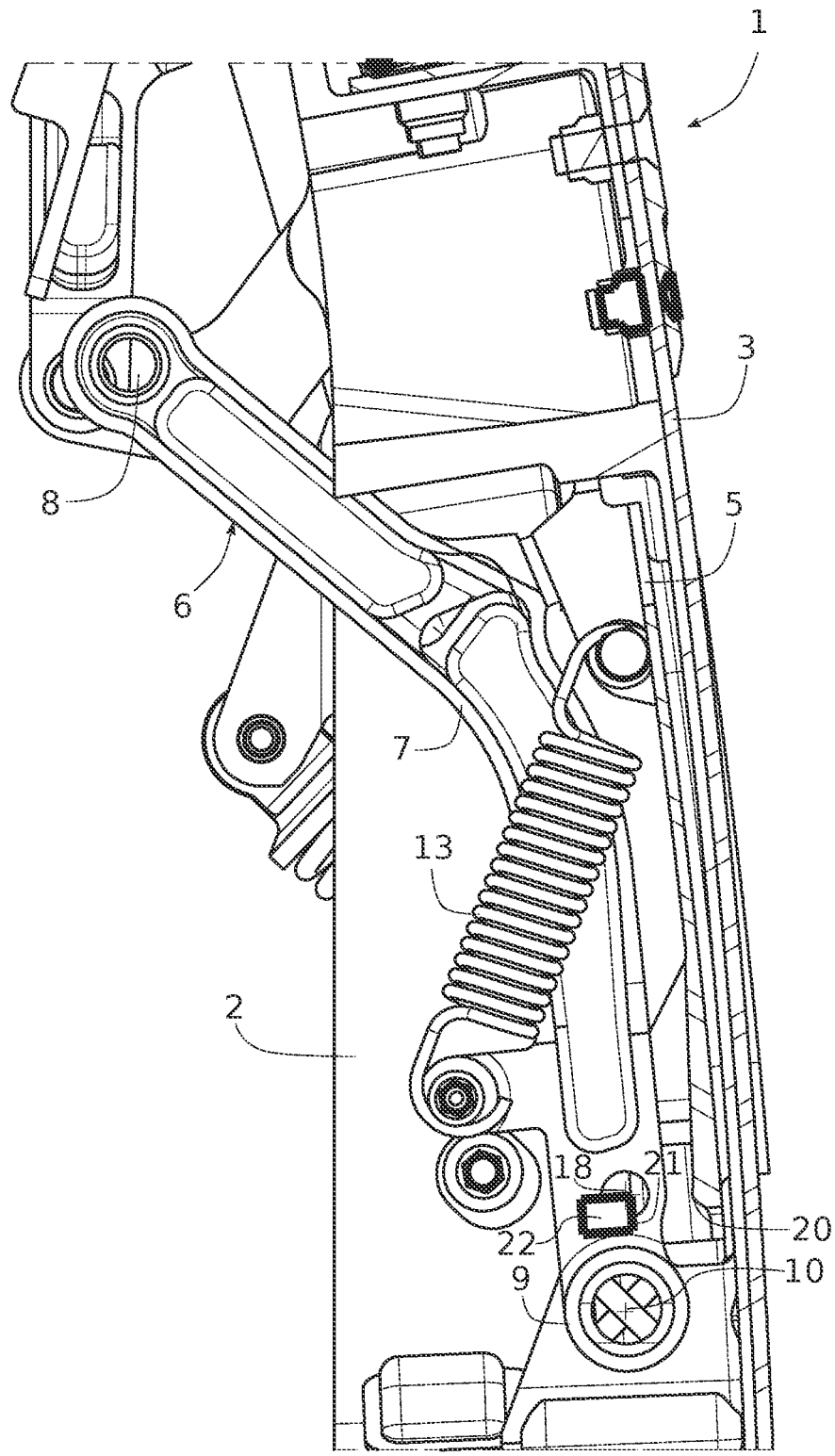
FIG. 5 is a view taken along the section line AA of FIG. 4.
Figure 6:
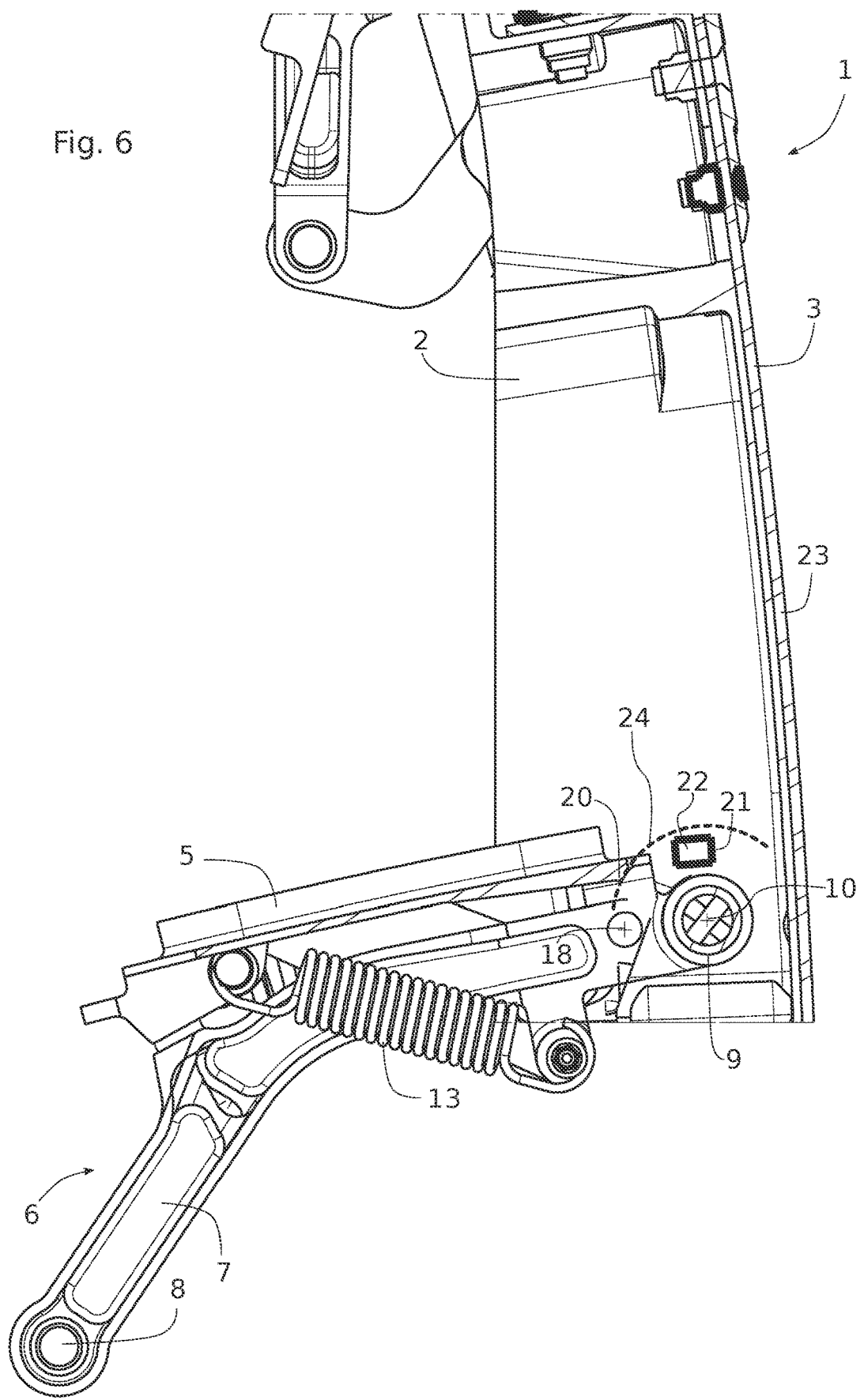
FIG. 6 is a view similar to FIG. 5, in a configuration where the opening of the door is allowed.
Figure 7:
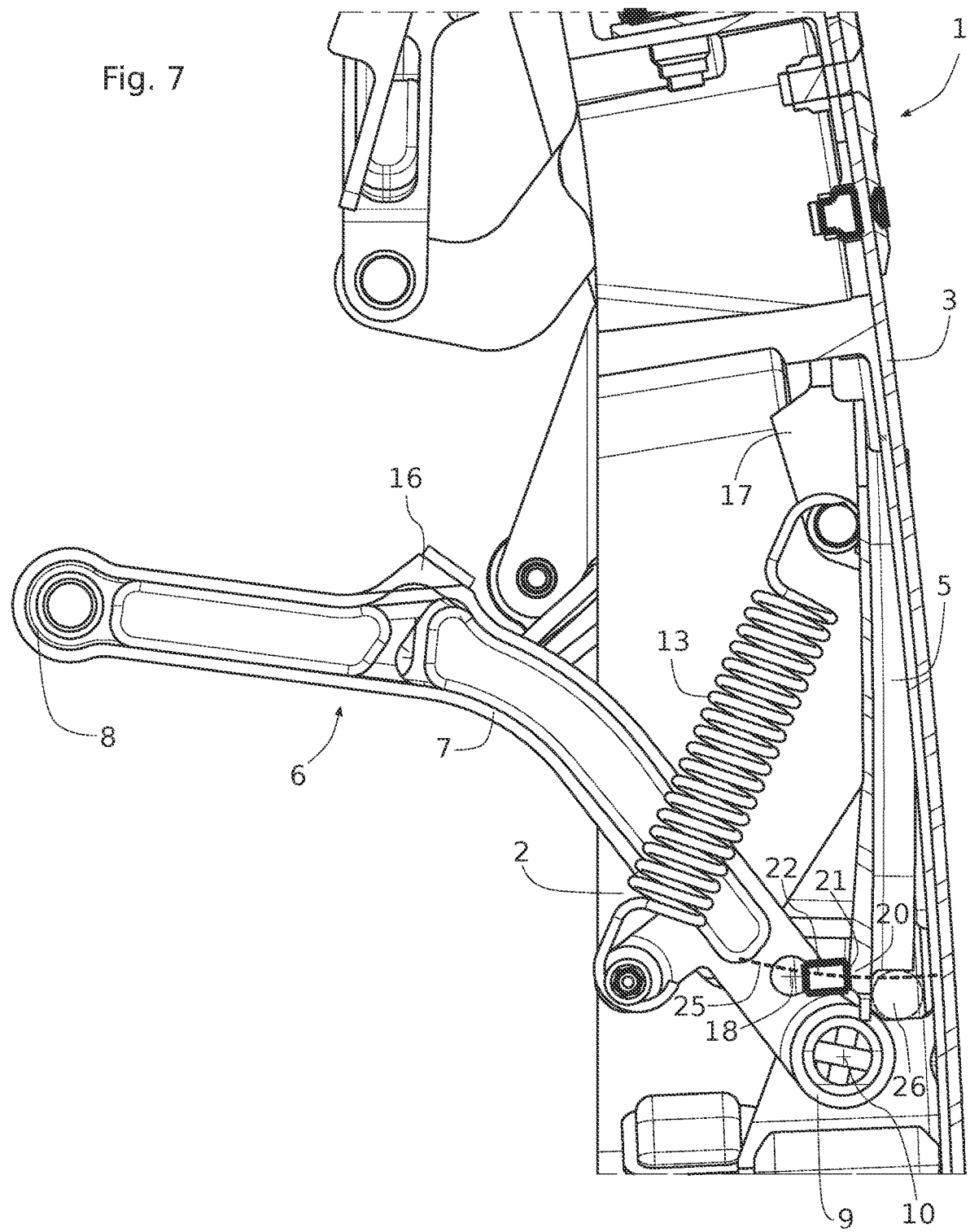
FIG. 7 is a view similar to FIG. 5, in a configuration where the opening of the door is not allowed.

FIGS. 5 to 7 are profile views showing in greater detail the configurations that have been described above.

Figure 4:
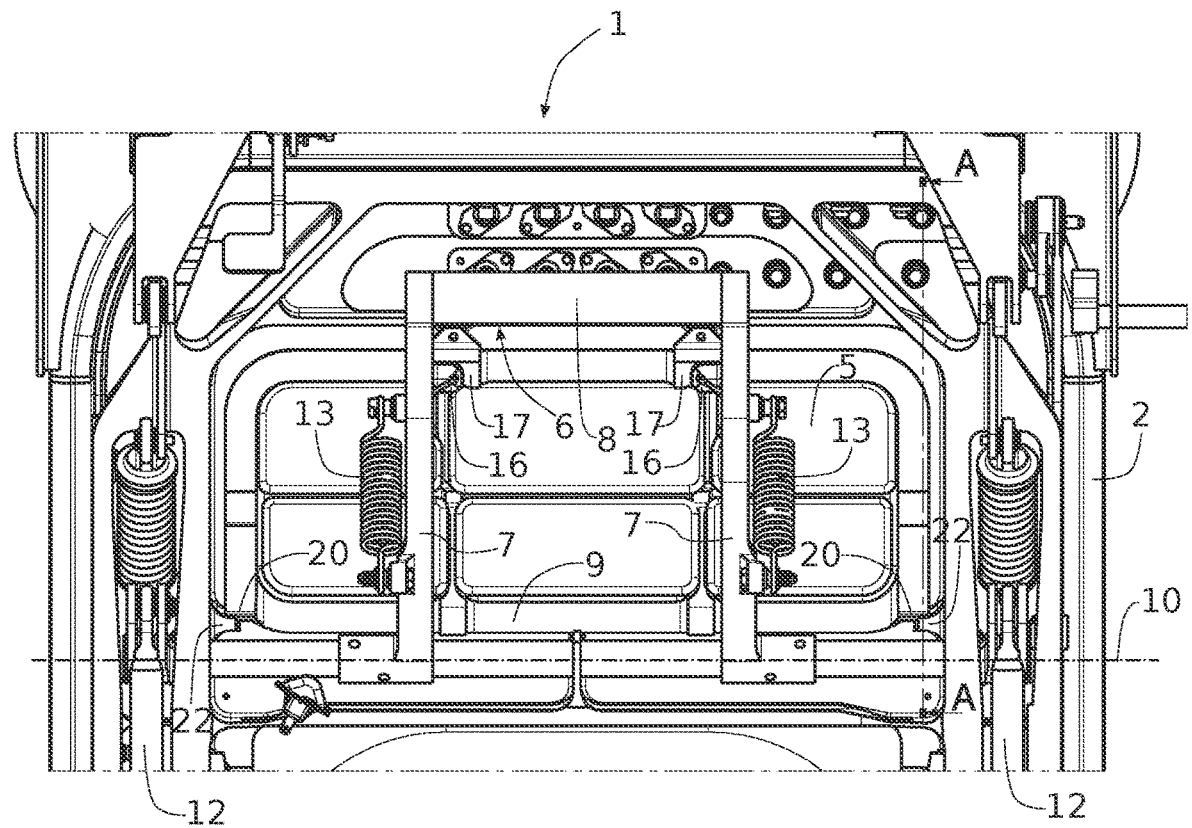
FIG. 4 is a partial face-on view of the door of FIG. 1.

FIG. 4 is a face-on view of the upper part of the door 1, defining a cross section AA. FIGS. 5 to 7 are views through this cross-section AA for the different configurations. The cross-section AA shows the inside lever 6 seen in profile, together with one of the flap stops 20 and its stop surface 21, seen in cross section.

FIG. 5 is a cross section corresponding to the configuration of FIG. 1. In this configuration, the door 1 is locked and the inside lever 6 is in the high position, corresponding to the locking of the locking means.

In addition to its function relating to the conditional opening mechanism, the inside lever 6 and the vent flap 5 can also perform a supplementary safety function enabling the pressurization of the aircraft to be prevented when the door 1 has not been locked. This is because the aircraft can be pressurized only when the vent flap 5 is closed. Consequently, the aircraft can only be pressurized only when the inside lever 6 is in its position shown in FIG. 1, in which the stops 17 push the vent flap 5 against the outer panel 3 so that the vent flap 5 closes the window 23 in an airtight manner.

FIG. 6 corresponds to the configuration of FIG. 2, where the release of the door 1 has been allowed because of a low differential pressure (below the predetermined threshold) applied to the vent flap 5. The first trajectory 24 described by the flap stop 20 between its position in FIG. 5 and its position in FIG. 6 is shown schematically by a broken line. This trajectory 24 is a circular arc centered on the first pivot axis 10, because the inside lever 6 and the vent flap 5 remain fixed together under the action of the springs 13, and rotate jointly about the first pivot axis 10. The stop surface 21 is positioned outside this first trajectory 24. In the present example, the first trajectory 24 passes around the stop surface 21 without interference with it. The inside lever 6 can therefore complete all the travel required to cause the release of the door 1, by operating the locking means using the operating mechanism 12. The joint rotation of the vent flap 5 and the inside lever 6 about the first pivot axis 10 permits this first trajectory 24 of the flap stops 20, in such a way that the stops 20 do not encounter the stop surfaces 21.

FIG. 7 corresponds to the configuration of FIG. 3, in which the release of the door 1 is prevented because of high differential pressure (above the predetermined threshold) applied to the vent flap 5. In this configuration, the inside lever 6 has been pivoted downward by an operator, while the vent flap 5, in its upper part at least, is held against the outer panel 3 by the differential pressure. On the other hand, since the distance between the two pivot axes 10, 18 is small relative to the distance between the first pivot axis 10 and the handle 8, the handle 8 has a significant lever effect, which, even with this high differential pressure, makes it possible to bring about the movement of the second pivot axis 18 which must accompany the pivoting of the inside lever 6 about the first pivot axis 10 (the pivots 19 being mounted on the inside lever 6). The flap stops 20 then each describe a second trajectory 25, which is shown schematically in broken lines in FIG. 7. This trajectory is a circular arc centered on the upper edge of the vent flap 5. The upper edge of the vent flap 5 is held against the corresponding edge of the window 23 by the differential pressure, while the lower edge of the vent flap 5 is slightly detached from the window 23 as a result of the movement of the second pivot axis 18 which accompanies the pivoting of the inside lever 6. The stop surfaces 21 are positioned on this second trajectory 25. In this configuration, the flap stops 20 come into contact with the stop surfaces 21 without having completed the travel required for the inside lever 6 to release the locking means of the door 1. The downward pivoting travel of the inside lever 6 is thus limited to the position of FIG. 7 and does not allow the release of the door 1.

The conditional opening mechanism here performs a supplementary function known as "de-icing". In this supplementary function, if the vent flap 5 continues to be held against the outer panel 3, not by a significant differential pressure but by the presence of ice on the outer face of the outer panel 3, the configuration of FIG. 7 enables the ice to be broken on the periphery of the vent flap 5, as a result of the movement of the lower part of the vent flap 5. The vent flap 5, being thus freed from the ice, then returns by itself to the configuration of FIG. 6, passing around the stop surface 21 under the effect of the pull of the springs 13.

With reference to FIG. 7, an optional compressible gasket 26 is positioned around the whole periphery of the vent flap 5 to ensure the tightness of the junction between the vent flap 5 and the window 23. The gasket 26 is, for example, an elastomeric gasket with a circular profile (shown in broken lines). The movement of the second pivot axis 18, under the effect of the rotation of the inside lever 6, to the position illustrated in the figure may be put to use according to two variants:

according to a first variant, the thickness of the compressible gasket 26 is sufficient to fill in a sealed way the gap created between the vent flap 5 and the edges of the window 23 when the vent flap 5 is in its position in FIG. 7. According to this first variant, the movement of the second pivot axis 18 therefore has no effect on the tightness of the vent flap 5, since the vent flap 5 continues to close the window 23 in an airtight way. The release of the door 1 is simply prevented, without any effect on the tightness of the door 1;

according to a second variant, the diameter of the compressible gasket 26 is smaller than the space created between the vent flap 5 and the edge of the window 23 by the movement of the second pivot axis 18. In this case, the actuation of the inside lever 6, while not allowing the release of the door 1, creates a leakage of air on the lower part of the vent flap 5. This calibrated leakage enables the aircraft cabin to be depressurized slowly by manipulating the inside lever 6, without any risk of the latter releasing the door 1. If the inside lever 6 is held in its position in FIG. 7, the slow depressurization continues until an acceptable differential pressure (below the predetermined threshold) is reached. When the differential pressure moves below the predetermined threshold, the vent flap 5 is then brought back by the springs 13 against the inside lever 6, in the same way as for the "de-icing" function, the flap stops 20 then passing around the stop surfaces 21. The travel of the vent flap 5 is then automatically freed, and the release of the door 1 can take place by a continuation of the downward pivoting of the inside lever 6, according to FIG. 6.

Variant embodiments of the aircraft door and its conditional opening mechanism may be provided without departing from the scope of the invention. For example, the flap stops 20 and the stop surfaces 21 may vary in quantity and position from the example described above. According to one variant, the flap stop may, for example, be fastened to the pivots 19, and the corresponding stop surface may be located on the shaft 9 which defines the first pivot axis 10, in such a way that, in its first trajectory, the flap stop makes no relative movement with respect to the stop surface, whereas, in its second trajectory, the flap stop comes up against this stop surface located on the shaft 9, thus limiting the travel of the inside lever 6.

On the other hand, the flap stop 20 may be formed by any element of the form of the vent flap 5, or any element attached to the vent flap 5.

In the design of an aircraft door according to the invention, the positioning of the stop surface and of the flap stops may, for example, be carried out in a pragmatic way, by initially designing an assembly provided with an inside lever with its first pivot axis, and with a vent flap mounted pivotably on the inside lever about a second pivot axis. One or more flap stops are then positioned on the vent flap. The first trajectory of the flap stops (the trajectory resulting when the vent flap and the inside lever pivot jointly about the first pivot axis) is then determined. Similarly, the second trajectory of the flap stops (the trajectory resulting from the movement of the second pivot axis while the vent flap is held against its window) is then also determined. The stop surfaces are then positioned so that they are both on the second trajectory and both outside the first trajectory. The invention may thus be applied easily to a wide range of different aircraft doors.

In the examples described above, the inside lever 6 forms an assembly comprising arms 7 and a handle 8, this assembly directly actuating the vent flap 5, thereby permitting, on the one hand, the operation of the second pivot axis 18 which acts eccentrically, and, on the other hand, the integration of the lugs 16 with the arms 7 in such a way that these lugs 16 interact directly with the stops 17 of the vent flap 5. In a variant, the coupling of the inside lever 6 to the vent flap 5, via the conditional opening mechanism, may be provided simply by the shaft 9, the vent flap 5 possibly being, for example, offset with respect to the handle 8.

The invention claimed is:

1. An aircraft door (1) comprising:
    a door structure (2) and an outer panel (3) fastened to the door structure (2);
    a locking device for locking the door (1) to a fuselage of the aircraft;
    an inside door opening lever (6) to operate the locking device, the inside door opening lever (6) coupled to a vent flap (5) by a conditional opening mechanism having a mode allowing the release of the door (1) when the differential pressure applied to the vent flap (5) is below a predetermined threshold and a mode for preventing the release of the door (1) when the differential pressure applied to the vent flap (5) is above the predetermined threshold;
    wherein the conditional opening mechanism comprises: a spring (13) urging the vent flap (5) and the inside door opening lever (6) against each other; a flap stop (20) positioned on the vent flap (5); a stop surface (21) positioned facing the flap stop (20);
    the inside door opening lever (6) is mounted pivotably on the door structure (2), about a first pivot axis (10) defining a first trajectory (24) of the flap stop (20) in which the vent flap (5) and the inside door opening lever (6) are held against each other by the spring (13) and pivot together about the first pivot axis (10), the stop surface (21) being positioned outside the first trajectory (24) of the flap stop (20);
    the vent flap (5) is pivotably mounted on the inside door opening lever (6), about a second pivot axis (18) defining a second trajectory (25) of the flap stop (20) in which the inside door opening lever (6) pivots about the first pivot axis (10) while the vent flap (5) and the inside door opening lever (6) pivots relative to each other about the second pivot axis (18), the stop surface (21) being positioned on the second trajectory (25) of the flap stop (20).

2. The aircraft door as claimed in claim 1, wherein the stop surface (21) is positioned on the door structure (2).

3. The aircraft door as claimed in claim 2, wherein the stop surface (21) is defined by a boss (22) on the door structure (2).

4. The aircraft door as claimed in claim 1, wherein the vent flap (5) comprises a sealing gasket (26) on a periphery.

5. The aircraft door as claimed in claim 4, wherein the sealing gasket (26) has a thickness for maintaining the seal between the vent flap (5) and the outer panel (3) when the flap stop (20) is in the second trajectory (25) and is positioned against the stop surface (21).

6. The aircraft door as claimed in claim 4, wherein the sealing gasket (26) has a thickness for creating a calibrated leakage between the vent flap (5) and the outer panel (3) when the flap stop (20) is in the second trajectory (25) and is positioned against the stop surface (21).

7. The aircraft door as claimed in claim 1, wherein the first pivot axis (10) is defined by a shaft (9) mounted by bearings (11) on the door structure (2), the inside door opening a lever (6) being fastened to the shaft (9).

8. The aircraft door as claimed in claim 7, wherein said shaft (9) is fixed to an operating mechanism (12) for the door locking device (1).

9. The aircraft door as claimed in claim 1, wherein the flap stop comprises a tooth (20) projecting from the vent flap (5).

10. The aircraft door as claimed in claim 1, wherein the flap stop comprises two stops (20) positioned on the lateral edges of the vent flap (5), the stop surface being formed by a stop surface (21) facing each of the stops (20).

11. The aircraft door as claimed in claim 1, wherein the spring comprises two tension springs (13), the ends of which are connected to the vent flap (5) and to the inside door opening lever (6) respectively.

12. The aircraft door as claimed in claim 1, wherein the second pivot axis (18) is defined by at least one pivot (19) by which the vent flap (5) is mounted rotatably on the inside door opening lever (6).

13. The aircraft door as claimed in claim 1, wherein the spring (13) has a stiffness suitable for:
    keeping the inside door opening lever (6) and the vent flap (5) fixed to each other when the differential pressure applied to the vent flap (5) is below the predetermined threshold;
    allowing the inside door opening lever (6) to pivot relative to the vent flap (5) when the differential pressure applied to the vent flap (5) is above the predetermined threshold.

14. The aircraft door as claimed in claim 1, wherein the first pivot axis (10) and the second pivot axis (18) are parallel and do not coincide.

15. The aircraft door as claimed in claim 1, wherein the first trajectory (24) is a trajectory in the form of a circular arc centered on the first pivot axis (10).

16. The aircraft door as claimed in claim 1, wherein the inside door opening lever (6) comprises a lever lug (16), and the vent flap (5) comprises a stop (17), the lever lug (16) being positioned against said stop (17) when the vent flap (5) and the inside door opening lever (6) are positioned against each other.

* * * * *